(12) United States Patent
Joao et al.

(10) Patent No.: US 10,275,250 B2
(45) Date of Patent: Apr. 30, 2019

(54) DEFER BUFFER

(71) Applicant: ARM Limited, Cambridge (GB)

(72) Inventors: Jose Alberto Joao, Austin, TX (US); Ziqiang Huang, Shanghai (CN); Alejandro Rico Carro, Austin, TX (US)

(73) Assignee: ARM Limited, Cambridge (GB)

( * ) Notice: Subject to any disclaimer, the term of this patent is extended or adjusted under 35 U.S.C. 154(b) by 44 days.

(21) Appl. No.: 15/450,430

(22) Filed: Mar. 6, 2017

(65) Prior Publication Data

US 2018/0253299 A1 Sep. 6, 2018

(51) Int. Cl.
*G06F 9/44* (2018.01)
*G06F 9/46* (2006.01)
*G06F 9/30* (2018.01)
*G06F 9/38* (2018.01)
*G06F 9/48* (2006.01)

(52) U.S. Cl.
CPC ........ *G06F 9/3009* (2013.01); *G06F 9/30101* (2013.01); *G06F 9/3867* (2013.01); *G06F 9/3005* (2013.01); *G06F 9/30123* (2013.01); *G06F 9/3838* (2013.01); *G06F 9/3855* (2013.01); *G06F 9/3857* (2013.01); *G06F 9/4881* (2013.01)

(58) Field of Classification Search
CPC .. G06F 9/3005; G06F 9/3009; G06F 9/30101; G06F 9/3867; G06F 9/30123; G06F 9/38; G06F 9/3838; G06F 9/3855; G06F 9/3857; G06F 9/4881; G06F 9/3832; G06F 9/3824; G06F 9/3836

USPC ................. 712/245, 248, 216–219
See application file for complete search history.

(56) References Cited

U.S. PATENT DOCUMENTS

| | | | | |
|---|---|---|---|---|
| 2001/0014941 | A1* | 8/2001 | Akkary | G06F 9/3834 712/228 |
| 2002/0144096 | A1* | 10/2002 | Burch | G06F 9/382 712/218 |
| 2010/0169581 | A1* | 7/2010 | Sheaffer | G06F 12/0831 711/141 |
| 2012/0079488 | A1* | 3/2012 | Phillips | G06F 9/30087 718/102 |

OTHER PUBLICATIONS

Hilton et al., "iCFP: Tolerating All-Level Cache Misses in In-Order Processors", Appears in Proceedings of HPCA-15, Feb. 2009, 12 pages.

(Continued)

*Primary Examiner* — Daniel H Pan
(74) *Attorney, Agent, or Firm* — Nixon & Vanderhye, P.C.

(57) ABSTRACT

An apparatus comprises processing circuitry for executing instructions of two or more threads of processing, hardware registers to store context data for the two or more threads concurrently, and commit circuitry to commit results of executed instructions of the threads, where for each thread the commit circuitry commits the instructions of that thread in program order. At least one defer buffer is provided to buffer at least one blocked instruction for which execution by the processing circuitry is complete but execution of an earlier instruction of the same thread in the program order is incomplete. This can help to resolve inter-thread blocking and hence improve performance.

20 Claims, 4 Drawing Sheets

(56) References Cited

OTHER PUBLICATIONS

Nekkalapu et al., "A Simple Latency Tolerant Processor", *IEEE International Conference on Computer Design*, Oct. 12-15, 2008, pp. 384-389.
Dundas et al., "Improving Data Cache Performance by Pre-Executing Instructions Under a Cache Miss", Proc. 1997 ACM Int. Conference on Supercomputing, Jul. 1997, 9 pages.
Barnes et al., "Flea-Flicker" Multipass Pipelining: An Alternative to the High-Powered Out-of-Order Offense, Published in 38th Annual IEEE/ACM International Symposium on Microarchitecture (MICRO'05), Nov. 12-16, 2005, 12 pages.
Cain et al., "Runahead Execution vs. Conventional Data Prefetching in the IBM POWER6 Microprocessor", Published in 2010 IEEE International Symposium on Performance Analysis of Systems & Software (ISPASS), Mar. 28-30, 2010, 10 pages.

\* cited by examiner

DEFER BUFFER

BACKGROUND

Technical Field

The present technique relates to the field of data processing.

Technical Background

Some data processing apparatuses may support concurrent execution of two or more threads of processing, with hardware registers being provided to store context data for multiple threads concurrently. This approach can be referred to as simultaneous multithreading (SMT), and can help increase the efficiency of utilisation of hardware resources and improve performance because if one thread is stalled another thread can continue to make progress, without incurring the thread switching latency of software-controlled context switches (where the registers only store context for one thread at a time and so an interrupt would trigger software to save the context data for the old thread to memory and replace it with context data for a new thread). With SMT, multiple threads can have instructions in flight within the pipeline simultaneously and the respective sets of context data for each thread may be accessible simultaneously within the hardware registers.

SUMMARY

At least some examples provide an apparatus comprising:
processing circuitry to execute instructions of a plurality of threads of processing;
hardware registers to concurrently store context data for the plurality of threads;
commit circuitry to commit results of executed instructions of the plurality of threads, wherein for each thread the commit circuitry is configured to commit the instructions of that thread in program order; and
at least one defer buffer to buffer at least one blocked instruction for which execution by the processing circuitry is complete but execution of an earlier instruction of the same thread in the program order is incomplete.

At least some examples provide an apparatus comprising:
means for executing instructions of a plurality of threads of processing using hardware registers for concurrently storing context data for the plurality of threads;
means for committing results of executed instructions of the plurality of threads, wherein for each thread the means for committing is configured to commit the instructions of that thread in program order; and
means for buffering at least one blocked instruction for which execution by the means for executing is complete but execution of an earlier instruction of the same thread in the program order is incomplete.

At least some examples provide a data processing method comprising:
executing instructions of a plurality of threads of processing using hardware registers for concurrently storing context data for the plurality of threads;
committing results of executed instructions of the plurality of threads, wherein for each thread the instructions of that thread are committed in program order; and
buffering in at least one defer buffer at least one blocked instruction for which execution is complete but execution of an earlier instruction of the same thread in the program order is incomplete.

Further aspects, features and advantages of the present technique will be apparent from the following description of examples, which is to be read in conjunction with the accompanying drawings.

DESCRIPTION OF EXAMPLES

Figure 1:
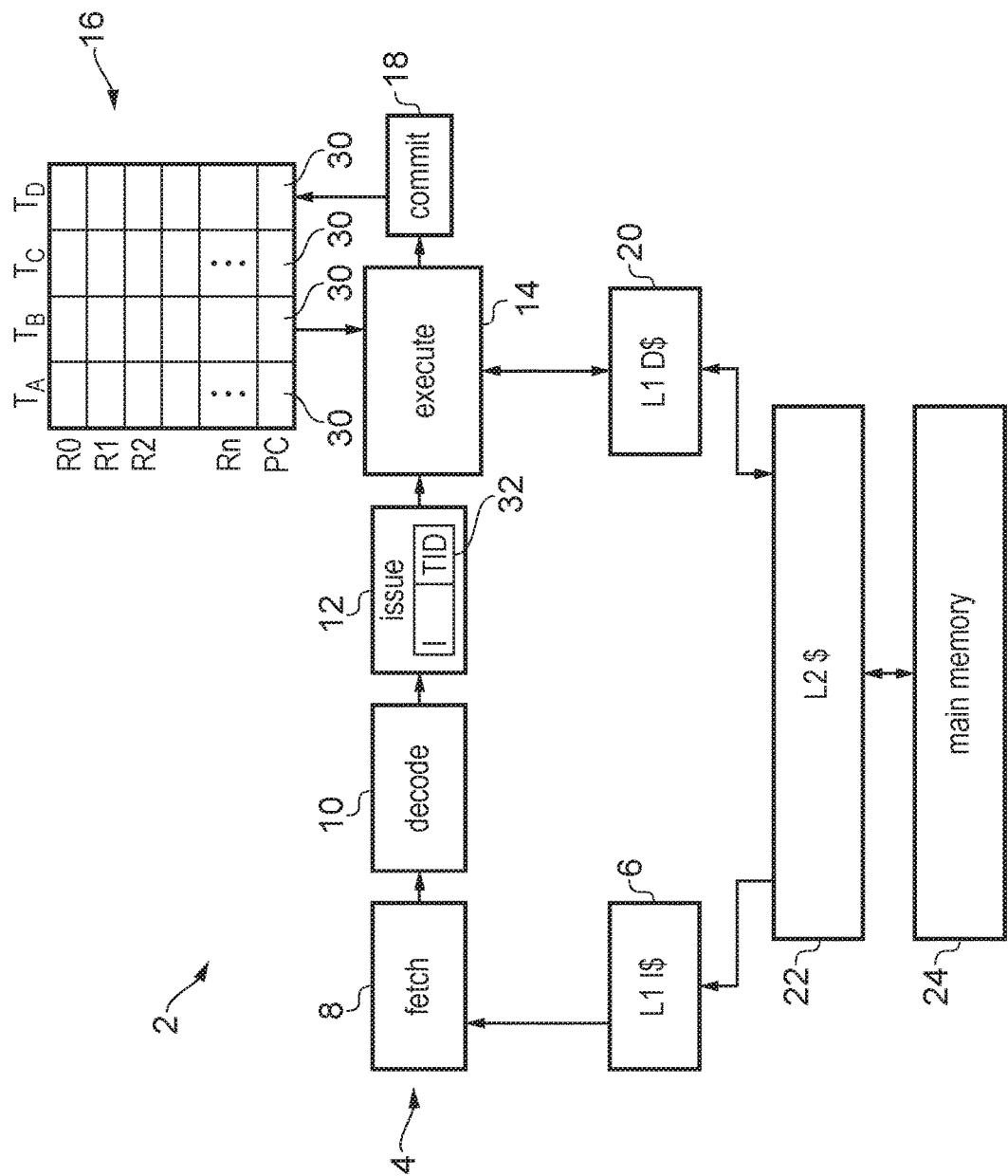
FIG. 1 schematically illustrates an example of data processing apparatus supporting execution of multiple threads concurrently with context data for each thread being stored in hardware registers.

An apparatus may have processing circuitry for executing instructions from multiple threads of processing and hardware registers to store context data for the multiple threads concurrently. For example, the apparatus may support simultaneous multi-threading (SMT). SMT-type techniques have traditionally been used mainly for more complex out-of-order processors, because with more complex processors there are often a large variety of execution resources available for executing instructions, but a given thread may not fully utilise all the available resources at a given time, and so by supporting execution of instructions from multiple threads concurrently, it is more likely that resource utilisation can be increased.

However, SMT-type techniques can also be used in an in-order processor, where instructions are issued for execution and committed in their original program order (the program order corresponding to the order of the instruction addresses of the executed instructions). In-order processors typically have less resource available and so are less likely to have much spare resource, so SMT is much less common for in-order processors. However, SMT can still be useful as if one thread is stalled (e.g. due to a long latency memory operation), then the in-order processing limitations mean that other instructions from the same thread cannot make progress, and SMT can allow other threads to make progress in the meantime. Hence, for an in-order SMT approach, the apparatus may have commit circuitry for committing results of executed instructions of the two or more threads, where for each thread the commit circuitry commits the instructions of that thread in program order.

However, in an in-order core using multiple threads active concurrently within the pipeline, it is possible for two or more of the threads to suffer inter-thread blocking, where a stalled instruction in one thread prevents progress being made in another thread. This is because the commit circuitry is restricted to commit the instructions of a given thread in program order, and so if an earlier instruction is stalled then it is not possible to commit a later instruction in the program order of the same thread, but instructions from other threads may be trapped behind the later instruction of the stalled thread in an execution pipeline and so may not be able to be executed or committed even though the other thread is independent of the stalled thread.

This problem can be addressed by providing at least one defer buffer to buffer at least one blocked instruction for which execution by the processing circuitry is complete but execution of an earlier instruction of the same thread in the program order is incomplete. Hence, in cases of inter-thread blocking the blocked instruction, which has completed execution and so is ready to commit other than the fact that the earlier instruction is still incomplete, can be moved to the defer buffer. This allows instructions from other threads to make progress in the processing circuitry, as they are not prevented from being committed because they are from a different thread to the incomplete instruction of the stalled thread. In practice, in an in-order pipeline the stalled thread will typically run out of independent instructions that can be issued relatively soon after the stalled instruction, so the defer buffer does not need to be very large to provide enough resource for resolving the inter thread blocking issue (e.g. a small number of defer buffer entries, e.g. 4, has found to be enough), and so it can be implemented with relatively low cost. Hence, this provides a relatively low-cost approach for resolving the inter-thread blocking problem.

The processing circuitry may have a number of functional units for executing respective classes of instructions. For example, one functional unit may execute integer instructions, another may execute floating-point instructions while another functional unit may execute load/store instructions. It is also possible to provide two or more functional units of the same type which each execute the same class of instructions. For example for performance reasons it may be useful to provide multiple integer functional units.

From the point of view of the commit circuitry, the defer buffer can be seen as another source of instructions to be committed, in addition to the functional units of the processing circuitry. Hence, the commit circuitry may select, as a next instruction to be committed from a given thread, an oldest instruction in the program order among the instructions of the given thread that are pending in any of the functional units and any of the defer buffers, and commit the next instruction when it is detected that execution of that next instruction is complete. Note that for the instructions in a defer buffer, those instructions are by definition instructions whose execution has already completed and so these instructions can be committed as soon as they become the oldest instruction remaining for a given thread. For instructions in the functional units, an additional check of whether the oldest instruction for the thread has been executed may be performed.

Defer buffer control circuitry may be provided to control allocation of blocked instructions to the at least one defer buffer. In response to detecting a blocked instruction in a given functional unit, the defer buffer control circuitry may transfer the blocked instruction from the given functional unit to one of the at least one defer buffer. Hence, the defer buffer enables blocked instructions to be removed from the function units so that instructions from another thread behind the blocked instruction in the given functional unit can make progress.

It would be possible for the defer buffer control circuitry to allocate blocked instructions to a defer buffer in any order, including an order different from the program order of that thread. However, in that case the defer buffer may need to be implemented as a content-addressable memory (CAM) structure where the commit circuitry can query any entry of the defer buffer to identify which instruction held in the defer buffer is the oldest for a given thread. This may increase the circuit overhead of the defer buffer.

Instead, the defer buffer control circuitry may in other embodiments allocate blocked instructions of a given thread to the at least one defer buffer in the program order of that thread. This means that the oldest entry in the defer buffer corresponds to the oldest remaining instruction of that thread and so the commit circuitry only needs to check the entry which was least recently allocated in order to identify the next instruction to be committed from the defer buffer. Hence, the defer buffer can then be implemented as a first in first out (FIFO) buffer, which is cheaper to implement in hardware than a content addressable memory. Hence, the defer buffer control circuitry may detect, as the blocked instruction, the oldest executed instruction of a given thread that has completed execution when at least one older instruction of the given thread is incomplete in a different functional unit to the oldest executed instruction. This enables the instructions to be allocated to the defer buffer in program order.

In some examples, it may be possible for a defer buffer to be shared between multiple threads, with instructions from multiple threads being allocated to the same defer buffer concurrently. However, enabling this option would in some cases require a CAM structure to allow the commit circuitry to query any entry of the defer buffer to identify the oldest uncommitted instruction for any of the multiple threads being executed by the processing circuitry. This overhead can be avoided by instead restricting defer buffer allocation so that once an instruction from a given thread has been allocated to a given defer buffer, the defer buffer control circuitry may prevent instructions from another thread being allocated to the given defer buffer until the given defer buffer is drained of instructions from that given thread. Hence, while the defer buffer is shared between threads in the sense that once the buffer becomes empty instructions from another thread can be allocated to the defer buffer, once there is one valid instruction from a particular thread in the given defer buffer, that defer buffer is reserved for that particular thread until there are no more blocked instructions in the defer buffer from that thread. Again, this enables the commit circuitry to restrict its search for the next instruction to be committed for a given thread to the instruction at the head (least recently updated entry) of the defer buffer, enabling use of a FIFO structure instead of a CAM.

Optionally, the defer buffer control circuitry may also apply other criterion for determining whether an instruction should be transferred to the defer buffer. In some cases, once a blocked instruction is identified and there is sufficient space in a defer buffer available for taking instructions from the relevant thread, the defer buffer control circuitry may transfer the blocked instruction to that defer buffer regardless of any other criterion, and independent of how many cycles the blocked instruction has remained uncommitted. This approach may be simplest to implement.

However, this could result in some instructions being allocated to the defer buffer when in fact they would have been able to commit soon afterwards. As space in the defer may be limited, it may be preferred to favour use of the defer buffer for instructions likely to remain blocked for a long time. Hence, in other examples, a determination of how long the blocked instruction has remained uncommitted may be made by the defer buffer control circuitry and this may be used to determine whether the blocked instruction should be transferred to the defer buffer. For example, the blocked instruction could be transferred when it remains uncommitted for more than a predetermined period after completion of execution, or when it remains uncommitted beyond an expected commit timing of the blocked instruction. The expected commit timing may be determined based on information provided by an issue stage of the processing circuitry which is responsible for scheduling execution of instructions and may be aware of how many processing cycles different types of instructions are likely to take. By restricting transfer of a blocked instruction to the defer buffer to cases when the blocked instruction remains uncommitted for more than a given amount of time, this allows for more efficient use of the space available in the defer buffer since instructions which remain blocked for a relatively short time can stay in the functional unit and save the space in the defer buffer for instructions more likely to block the pipeline for a long time.

Another criterion for determining whether to transfer the blocked instruction may be whether or not an instruction of a different thread to the blocked instruction is pending in the same functional unit. A less complex implementation could simply transfer the blocked instruction to the defer buffer regardless of whether there are actually any instructions from a different thread behind it in the same functional unit. However, it is possible that all the instructions pending in that given functional unit could be from the same thread (e.g. only one thread may currently be using a floating point unit for example and so there may not be any other threads behind a blocked instruction in the floating point unit). In cases where there are no instructions from other threads behind the blocked instruction in the same functional unit, there is less benefit in transferring the blocked instruction to the defer buffer because instructions from the same thread would also be blocked. By restricting the transfer of instruction to the defer buffer to cases when a different thread can make progress after the blocked instruction, this enables more efficient use of the defer buffer.

In some embodiments the hardware resources for providing simultaneous multi-threading may only support two concurrent threads at a time, and in this case a single defer buffer is enough. Even in systems which support more than two hardware threads, a single defer buffer may still be enough since often in practice only some of the hardware threads may suffer from inter-thread blocking and so just providing one defer buffer that can be used by the first thread suffering from inter-thread blocking can provide most of the performance benefit.

However, some examples may provide two or more defer buffers which can enable improved performance, especially in cases where each defer buffer can be allocated with instructions from only one thread at a time in order to enable implementation as a FIFO buffer as discussed above. In this case, then by providing multiple defer buffers it is possible to remove blocked instructions from more than one thread from the functional units of the processing circuitry to enable other threads to make progress, increasing the likelihood that some forward progress can be made in the presence of a stall.

The hardware registers which store context data for two or more threads concurrently are one example of a hardware resource supporting simultaneous multi-threading. In some cases a number of distinct sets of registers may be provided for each of the threads which cannot be reallocated or repartitioned, with a certain fixed number of registers provided for each of the hardware threads. However, in other examples a reallocatable register bank could be used which can be partitioned in different ways depending on the number of threads being executed.

Other examples of hardware resources which may be provided to support SMT may include one or both of the following:

Each instruction processed by the processing circuitry may be passed down the processing pipeline together with a thread identifier which identifies the thread associated with that instruction. This allows the execute stage for example to identify which set of the hardware registers to update with results of the instruction and enables the commit circuitry to track which instructions can be committed once they become the oldest instruction from a given thread.

The hardware registers may store multiple program counters indicating the current point of execution for a corresponding thread, with each program counter corresponding to a different thread being executed by the processing circuitry.

FIG. 1 illustrates an example of a data processing apparatus 2 which includes a processing pipeline 4 having a number of pipeline stages. The pipeline 4 is an in-order processing pipeline, so instructions are issued and committed in their original program order (corresponding to the order in which the instruction addresses are defined for the corresponding program). The instructions for a number of threads of processing are stored in a level 1 instruction cache 6. The processing pipeline includes a fetch stage 8 for fetching instructions from the instruction cache 6, a decode stage 10 for decoding the fetched instructions, an issue stage 12 for determining whether required operands for processing of the instructions are available and issuing the instructions for execution when their operands are available, an execute stage 14 for executing the instructions using the operands which are read from a register file 16 to generate processing results, and a commit stage 18 for committing the processing results to architectural state by writing the results to the hardware registers 16 for committed instructions. The commit stage commits the instructions in program order. The execute stage 14 may, in response to load/store instructions, access data in a level 1 data cache 20. The level 1 instruction cache 6 and level 1 data cache 20 are part of a memory system which may also include one or more further level caches, such as level 2 cache 22 shared for data and instructions, as well as main memory 24. It will be appreciated that this is just one example of a possible memory hierarchy and other arrangements can also be used.

The in-order pipeline 4 supports simultaneous multi-threading so that instructions from multiple threads can be in flight within the pipeline concurrently. A number of hardware features are provided to enable this. For example, the register file 16 includes sets of hardware registers for storing multiple sets of architectural state data for each of a number of threads. For example, in FIG. 1 the system supports up to four threads being executed concurrently, and so four sets of context data registers R0-Rn, PC are provided, one for each thread. This includes a program counter register 30 which indicates the current point of execution reached for a given thread, and therefore multiple program counter registers are provided so that each thread can be indicated as reaching a different point of execution. It will be appreciated that other control information registers could also be banked per thread. Also, instructions passing down the pipeline are accompanied by a thread identifier 32 which identifies which thread the instruction belongs to. The thread identifier can then be used for scheduling of instructions at the issue stage 12 to take account of register dependencies between instructions of the same thread, at the execute stage 14 for determining which banked version of the register file to access for the instruction's operands, and at the commit stage for controlling commitment of a given thread so that the instructions from a given thread are committed in their original program order, while instructions from different threads can be committed in any order.

Figure 2:
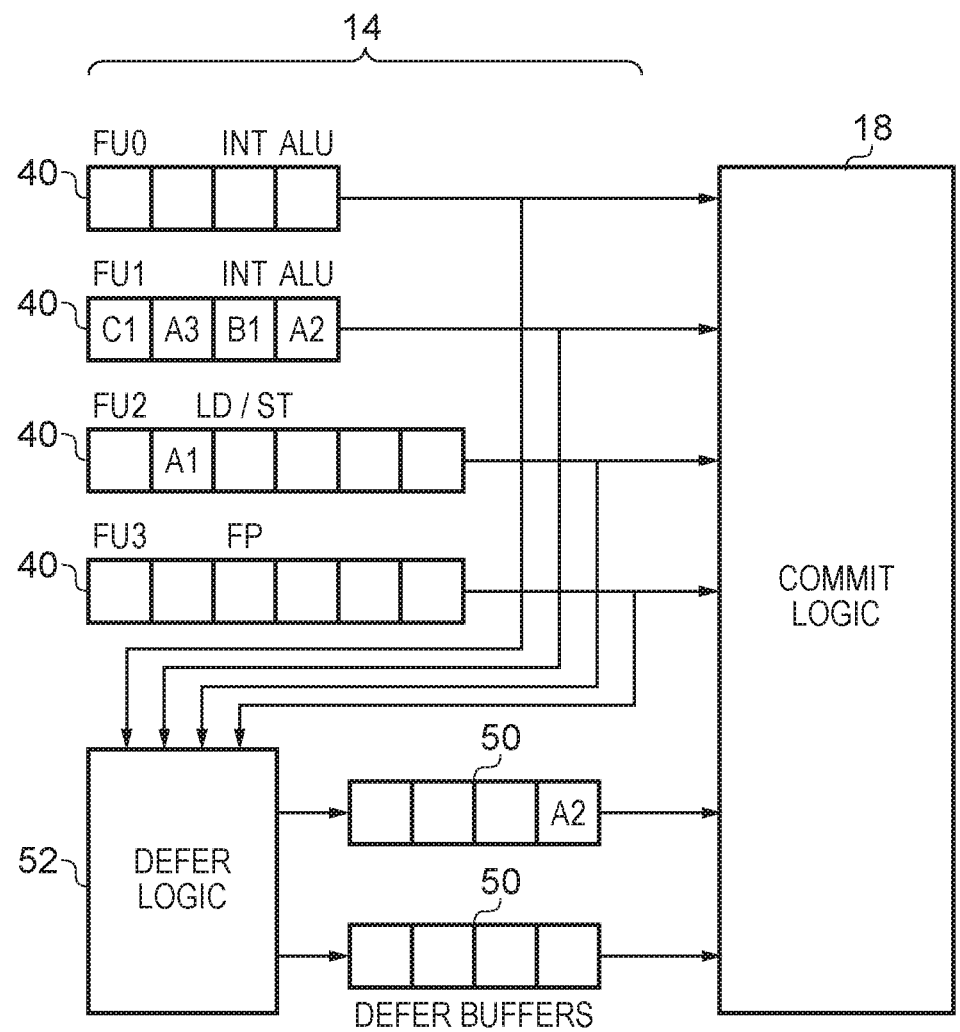
FIG. 2 shows an example of execution and commit stages of the pipeline provided with at least one defer buffer for buffering blocked instructions.

FIG. 2 shows part of the execute stage 14 and the commit stage 18 in more detail. The execute stage 14 includes a number of functional units 40 which each provide a separate execution pipeline for processing instructions issued by the issue stage 12. Each functional unit 40 may be dedicated to processing a particular class of instructions. For example, FIG. 2 shows an execute stage 14 having two integer ALU functional units FU0, FU1 for executing integer arithmetic or logical instructions, a load/store functional unit FU2 for executing load instructions for loading data from the memory system to the register file 16 or store instructions for storing data from the register file 16 to the memory system, and a floating point functional unit FU3 for executing floating point instructions which act on floating point operands and/or generate floating point results. It will be appreciated that other types of functional unit could also be provided. An instruction of a given type is allocated to the relevant functional unit and as it progresses down the execution pipeline it is executed to generate the required processing results. By the time the instruction reaches the end of a given functional unit execution pipeline, its execution is complete in the sense that the instruction is ready to be committed. However, if the executed instruction reaching the end of a given functional unit is not the oldest instruction in the program order remaining for the corresponding thread, then it cannot be committed as the commit logic 18 commits in program order, and so this may stall the corresponding functional unit.

Such stalling can lead to inter-thread blocking. An example of a scenario which can lead to this problem is shown in FIG. 2. For example, the oldest instruction A1 in a first thread A is pending in the load/store functional unit and is stalled because it requested data from the level 1 data cache 20 and there was a cache miss and so there is a delay while the data is being obtained from the memory system. Hence, instruction A1 cannot complete execution yet. Meanwhile, a subsequent instruction A2 from the same thread A has reached the end of one of the integer ALU functional units and has completed execution, however it cannot be committed yet because it is not the oldest instruction of thread A. Therefore, instruction A2 blocks the integer ALU pipeline. An instruction B1 from a different thread B is pending behind instruction A2 in the integer functional unit and although it is independent of instruction A2 it is still stuck behind it in the same functional unit pipeline and so cannot complete execution. Also, if the functional unit including the blocked instruction A2 is already full of instructions then it also cannot accept any new instructions issued from the issue stage 12 which may also prevent a given thread which does not have any older instructions blocked behind instruction A2 making progress if no other functional unit with the required functionality is available. Hence this inter-thread blocking problem in an in-order SMT pipeline can reduce the performance which can be achieved.

This problem can be addressed using one or more defer buffers 50 which are provided to allow a blocked instruction to be removed from the functional unit 40 when it has completed execution and is ready to commit but is not the oldest instruction in the corresponding thread. This enables the corresponding functional unit 40 to be unblocked so that instructions behind the blocked instruction from other threads can then make progress. In this example two defer buffers 50 are provided after the execution functional units 40 to store blocked instructions like instruction A2 which have completed execution but still cannot commit because an older instruction in the same thread is stalled. Defer buffer control logic 52 is provided to examine the instructions in the respective functional units 40 to detect blocked instructions which should be allocated to the defer buffers. From the point of view of the commit logic 18, the defer buffers 50 simply become another source of completed instructions like the execution pipelines of the functional units 40. The defer logic 52 allocates blocked instructions of a given thread to the defer buffers in program order and once a given instruction A2 of one thread A has been allocated to one particular defer buffer 50, instructions from other threads B, C etc. cannot be allocated to that defer buffer until the defer buffer is drained. Providing two or more defer buffers 50 enables more threads to be unblocked, but other examples may provide just a single defer buffer.

Figure 3:
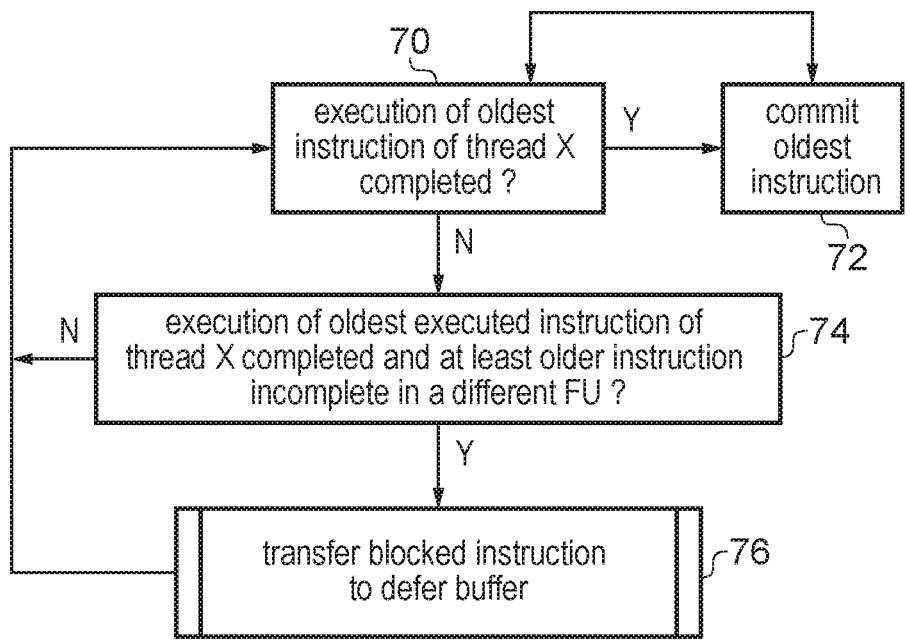
FIG. 3 is a flow diagram illustrating a method of controlling commitment of instructions.

FIG. 3 is a flow diagram illustrating processing by the defer buffer control logic 52 and the commit stage 18. At step 70 the commit logic 18 determines for a given thread X whether execution of the oldest instruction in thread X has completed. If execution of the oldest instruction has completed then at step 72 the oldest instruction in thread X is committed by the commit stage 18 and removed from the functional unit 40 or defer buffer 50. Note that the oldest instruction in thread X could be either in a functional unit 40 or in the defer buffer 50, and that while for the functional units 40 the oldest instruction for thread X may or may not have completed, if the oldest instruction is in a defer buffer 50 then it will already by definition have completed execution. After committing the oldest instruction for thread X, the method returns to step 70 to check for the next oldest instruction.

Figure 4:
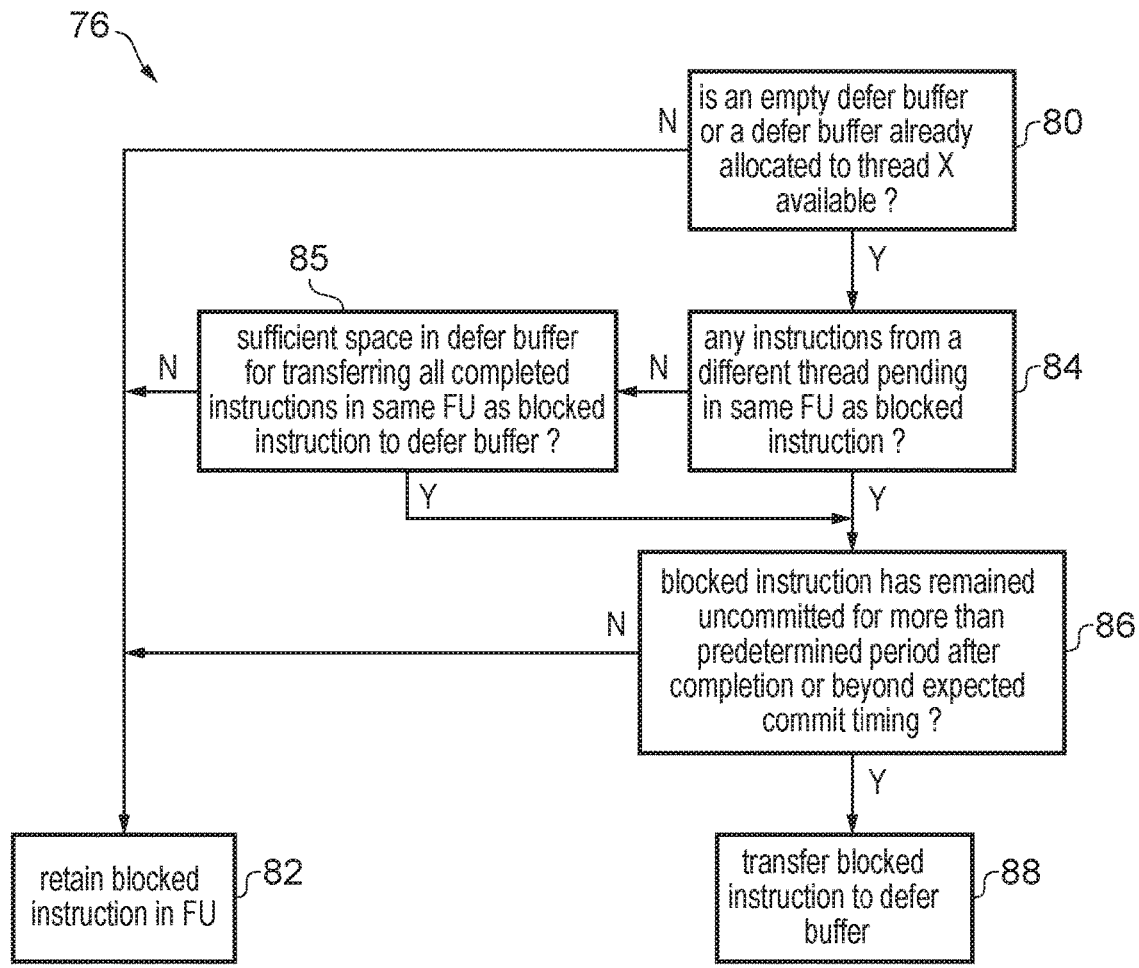
FIG. 4 is a flow diagram illustrating a method of determining whether to transfer a blocked instruction to the defer buffer.

If the oldest instruction in thread X has not yet completed execution then at step 74 the defer buffer control logic 52 determines whether execution of the oldest executed instruction of thread X has completed when at least one older instruction is incomplete in a different functional unit to the oldest executed instruction of that thread. If not, then no transfer of an instruction to the defer buffer is made and the method returns to the step 70 to continue waiting for the oldest instruction of thread X to complete. However, if the oldest executed instruction in thread X is complete and in a different function unit to the oldest instruction, then the oldest executed instruction is identified as a blocked instruction, and at step 76 a process for transferring the blocked instruction from the functional unit 42 the defer buffer 50 is triggered. In some implementations the blocked instruction could be transferred to one of the defer buffers 50 whenever the criterion of step 74 is satisfied (assuming there is space available in a defer buffer 50). However, it is also possible to apply one or more additional criteria for determining whether to transfer the blocked instruction pending for thread X to the defer buffer 50. FIG. 4 shows these criteria in more detail.

As shown at step 80 of FIG. 4, the defer buffer control circuitry may determine whether there is an empty defer buffer 50 or a defer buffer 50 which is already allocated for buffering instructions from thread X with available space for the blocked instruction. If not, then the blocked instruction is not transferred and instead at step 82 the blocked instruction is retained in its corresponding functional unit 40. This criterion of step 80 ensures that a given defer buffer 50 can only contain instructions from one thread at a time, so that the commit logic 18 does not need to look for more than one entry of the defer buffer when determining which instruction is the oldest executed instruction for a given thread. This supports implementation of the defer buffer as a FIFO.

If there is an empty defer buffer or space available in a defer buffer already allocated to thread X, then at step 84 the defer buffer control logic 52 checks whether there are any instructions from a different thread to thread X pending in the same functional unit 40 as the blocked instruction. If not, then at step 85 it is checked whether there is sufficient space in an empty defer buffer 50 or defer buffer already allocated to thread X to accommodate transfer for all the completed instructions from thread X which are pending in the same functional unit as the blocked instruction. If there are no instructions from a different pending thread in the same functional unit 40 as the blocked instruction, and there is not sufficient space for accommodating all the completed instructions from the same functional unit in the defer buffer 50, then again at step 82 the blocked instruction is retained in the functional unit 40. However, if there is an instruction from a different thread pending, or there would be space for transferring all the completed instructions of thread X from the functional unit containing the blocked instruction, then the method moves onto step 86. The criterion applied at step 84 restricts usage of the defer buffer to cases where there is an instruction from a different thread pending behind the blocked instruction, in which case it is more likely that transferring the blocked instruction from the functional unit to the defer buffer can allow forward progress of another thread, to avoid populating the defer buffers with instructions which do not actually allow unblocking of stalled threads.

At step 86 the defer buffer control logic 52 determines whether the blocked instruction has remained uncommitted for more than a determined period after completion of execution, or beyond an expected commit timing. If not, then again at step 82 the blocked instruction is retained in the functional unit 40, while if the blocked instruction has remained uncommitted for more than the period or beyond its expected commit timing then at step 88 the blocked instruction is transferred to one of the defer buffers 50. If there is a defer buffer already allocated to thread X then that defer buffer is used to allocate the blocked instruction (assuming that buffer is not already full), while if there is not already a defer buffer allocated to thread X then an empty defer buffer is used. The information on the expected commit timing for the blocked instruction can be provided from the issue stage which will typically have scheduled the instructions with knowledge of how many cycles a given instruction is expected to take.

The criteria applied in FIG. 4 at steps 80, 84 and 86 are not essential and in other examples one or more of these steps could be omitted so that the blocked instruction can be transferred to the defer buffer even if one or more of these criterion is not satisfied.

The methods shown in FIGS. 3 and 4 may be performed separately for each of the threads supported by the pipeline (each thread may step through FIGS. 3 and 4 concurrently with, and independently of, the method for other threads). Hence, while thread A may be stalled because its oldest instruction cannot yet commit, thread B may still make progress. While FIGS. 3 and 4 for ease of explanation describe commitment and transfer to the defer buffer of a single instruction at a time, some implementations may provide commit logic 18 and defer logic 52 which is able to process more than one instruction per cycle, usually from the same thread, as long as the program order is not violated.

In some examples, the issue stage 12 may control whether a given thread is allowed to issue more instructions to the execute stage 14 in dependence on the current occupancy of the defer buffer for that thread and/or the number of instructions issued after a stalled instruction (e.g. an instruction encountering some long latency operation such as a cache miss) has been detected. This can reduce the likelihood that the functional units 40 fill up with instructions from the blocked thread, increasing the chance that other threads can make progress. Also, this reduces the chance that one thread issues more blocking instructions that the number of available defer buffer entries, which could render the defer buffer mechanism unable to prevent further inter-thread blocking.

For example, the issue stage 12 may prevent instructions from a given thread being issued to the processing circuitry for execution when a buffer occupancy indicative of how many instructions from said given thread are pending in the at least one defer buffer reaches or exceeds a predetermined threshold. The threshold could correspond to the defer buffer associated with the given thread being completely full, or could be set at a lower level to suspend issue of the given thread earlier so that instructions from the blocked thread already in the functional units 40 can still enter the defer buffer 50. Once the defer buffer starts to unblock and the buffer occupancy drops below the threshold, the issue stage 12 may start issuing of instructions of the blocked thread again.

Alternatively, the issue stage 12 may prevent instructions from a given thread being issued to the processing circuitry for execution when a predetermined number of instructions from the given thread have been issued to said processing circuitry after an instruction for which a stall condition (e.g. a cache miss or other long latency event) is detected. For example, the predetermined number of instructions could correspond to the size of one defer buffer 50, so that following a stalled instruction there will be enough space to fit the subsequent instructions of the same thread within the defer buffer. Alternatively, the predetermined number of instructions could be less than the capacity of a defer buffer 50. For example, in practice stopping issue as soon as a long-latency instruction is detected may suffice (so the predetermined number of instructions could be zero) given that an in-order processor is not likely to find too many independent instructions in the shadow of a long-latency instruction. Either way, issue of instructions from the blocked thread may be restarted once the long latency instruction is completed.

Another option for dealing with a defer buffer becoming full is to use selective flushing. When the defer buffer for a thread is full, any younger instructions that were issued to the functional units are flushed. If the core supports instruction replay, those instructions could be reissued after the corresponding thread is unblocked, otherwise, all younger instructions can be flushed and the program counter can be set to restart fetching from the oldest flushed instruction after the thread is unblocked. Hence, in response to a given defer buffer associated with a given thread becoming full, the processing circuitry may flush one or more remaining instructions associated with the given thread which are pending in said processing circuitry. This reduces the chance that blocked instructions which cannot be accommodated in the defer buffer are blocking progress of instructions of other threads.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
in-order processing circuitry to execute instructions of a plurality of threads of processing;
hardware registers to concurrently store context data for the plurality of threads;
commit circuitry to commit results of executed instructions of the plurality of threads, wherein for each thread the commit circuitry is configured to commit the instructions of that thread in program order and the in-order processing circuity is configured to execute the instructions of that thread issued for execution in the program order; and
at least one defer buffer to buffer at least one blocked instruction for which execution by the in-order processing circuitry is complete but execution of an earlier instruction of the same thread in the program order is incomplete.

2. The apparatus according to claim 1, wherein the in-order processing circuitry comprises a plurality of functional units to execute respective classes of instructions; and
the commit circuitry is configured to select, as a next instruction to be committed for a given thread, an oldest instruction in the program order among instructions of said given thread that are pending in the plurality of functional units and said at least one defer buffer, and to commit said next instruction when it is detected that execution of said next instruction is complete.

3. The apparatus according to claim 1, comprising defer buffer control circuitry to control allocation of blocked instructions to said at least one defer buffer.

4. The apparatus according to claim 3, wherein the in-order processing circuitry comprises a plurality of functional units to execute respective classes of instructions; and
in response to detecting a blocked instruction in a given functional unit, the defer buffer control circuitry is configured to transfer the blocked instruction from the given functional unit to one of said at least one defer buffer.

5. The apparatus according to claim 3, wherein the defer buffer control circuitry is configured to allocate blocked instructions of a given thread to the at least one defer buffer in the program order.

6. The apparatus according to claim 4, wherein the defer buffer control circuitry is configured to detect, as said blocked instruction, the oldest executed instruction of a given thread that has completed execution when at least one older instruction of said given thread is incomplete in a different functional unit to said oldest executed instruction.

7. The apparatus according to claim 3, wherein following allocation of an instruction from a given thread to a given defer buffer, the defer buffer control circuitry is configured to prevent instructions from another thread being allocated to said given defer buffer until said given defer buffer is drained of instructions from said given thread.

8. The apparatus according to claim 7, wherein in response to said given defer buffer becoming full, the in-order processing circuitry is configured to flush one or more remaining instructions associated with said given thread which are pending in said in-order processing circuitry.

9. The apparatus according to claim 4, wherein in response to detecting the blocked instruction, the defer buffer control circuitry is configured to transfer the blocked instruction to said one of said at least one defer buffer independent of how many cycles the blocked instruction has remained uncommitted.

10. The apparatus according to claim 4, wherein the defer buffer control circuitry is configured to transfer the blocked instruction when the blocked instruction remains uncommitted for more than a predetermined period after completion of execution.

11. The apparatus according to claim 4, wherein the defer buffer control circuitry is configured to transfer the blocked instruction when the blocked instruction remains uncommitted beyond an expected commit timing of the blocked instruction.

12. The apparatus according to claim 4, wherein in response to detecting the blocked instruction, the defer buffer control circuitry is configured to select whether to transfer the blocked instruction in dependence on whether an instruction of a different thread to said blocked instruction is pending in said given functional unit or whether there is space in said at least one defer buffer for accommodating all completed instructions in the given functional unit from the same thread as the blocked instruction.

13. The apparatus according to claim 1, comprising a plurality of defer buffers.

14. The apparatus according to claim 1, wherein each instruction processed by the in-order processing circuitry is associated with a thread identifier identifying the thread associated with that instruction.

15. The apparatus according to claim 1, wherein the hardware registers are configured to store a plurality of program counters each corresponding to one of the plurality of threads.

16. The apparatus according to claim 1, comprising issue control circuitry to prevent instructions from a given thread being issued to the in-order processing circuitry for execution when a buffer occupancy indicative of how many instructions from said given thread are pending in said at least one defer buffer reaches or exceeds a predetermined threshold.

17. The apparatus according to claim 1, comprising issue control circuitry to prevent instructions from a given thread being issued to the in-order processing circuitry for execution when a predetermined number of instructions from said given thread have been issued to said in-order processing circuitry after an instruction for which a stall condition is detected.

18. The apparatus according to claim 17, wherein the predetermined number of instructions corresponds to a capacity of one of said at least one defer buffer.

19. An apparatus comprising:
means for in-order execution of instructions of a plurality of threads of processing using hardware registers for concurrently storing context data for the plurality of threads;
means for committing results of executed instructions of the plurality of threads, wherein for each thread the means for committing is configured to commit the instructions of that thread in program order and the means for in-order execution is configured to execute the instructions of that thread issued for execution in the program order; and means for buffering at least one blocked instruction for which execution by the means for in-order execution is complete but execution of an earlier instruction of the same thread in the program order is incomplete.

20. A data processing method comprising:

executing, using in-order processing circuitry, instructions of a plurality of threads of processing using hardware registers for concurrently storing context data for the plurality of threads;

committing results of executed instructions of the plurality of threads, wherein for each thread the instructions of that thread are issued for execution and committed in program order; and buffering in at least one defer buffer at least one blocked instruction for which execution is complete but execution of an earlier instruction of the same thread in the program order is incomplete.

* * * * *